United States Patent

Goyal et al.

[11] Patent Number: 5,873,108
[45] Date of Patent: Feb. 16, 1999

[54] PERSONAL INFORMATION MANAGER INFORMATION ENTRY ALLOWING FOR INTERMINGLING OF ITEMS BELONGING TO DIFFERENT CATEGORIES WITHIN A SINGLE UNIFIED VIEW

[75] Inventors: Jai Goyal; Jean Tze-Yin Pang Goyal, both of Palo Alto, Calif.

[73] Assignee: Fuga Corporation, Palo Alto, Calif.

[21] Appl. No.: 728,178

[22] Filed: Oct. 19, 1996

Related U.S. Application Data

[63] Continuation-in-part of Ser. No. 394,487, Feb. 27, 1995, abandoned.

[51] Int. Cl.$^6$ ..................................................... G06F 3/00
[52] U.S. Cl. ........................ 707/507; 707/509; 345/339; 345/347; 345/350
[58] Field of Search ..................................... 395/766, 767, 395/768, 773, 792, 793, 796, 804, 339, 340, 347, 348, 349, 350; 345/146, 173, 339, 340, 345, 347, 348, 349, 350; 707/505, 506, 507, 512, 530, 531, 534, 541

[56] References Cited

U.S. PATENT DOCUMENTS

| | | | |
|---|---|---|---|
| 5,220,540 | 6/1993 | Nishida et al. | 368/41 |
| 5,237,651 | 8/1993 | Randall | 395/350 |
| 5,247,438 | 9/1993 | Subas | 364/400 |
| 5,260,697 | 11/1993 | Barrett et al. | 345/173 |
| 5,379,057 | 1/1995 | Clough et al. | 345/173 |
| 5,394,166 | 2/1995 | Shimada | 345/98 |
| 5,457,476 | 10/1995 | Jenson | 345/146 |

OTHER PUBLICATIONS

Cowart, Mastering windows 3.1, SYBEX, 1993, pp.49, 398–409 and 428–419.

Gore, Andrew et al., "Understanding Newton", *Newton's Law, a Digital Nomad's Guide*, 1:47 (1993).

*Primary Examiner*—Stephen S. Hong
*Attorney, Agent, or Firm*—Burns, Doane, Swecker & Mathis LLP

[57] ABSTRACT

A personal information manager is based on a different paradigm than the conventional paper/pencil paradigm, resulting in a personal information manager that is dramatically simpler and easier to use. The personal information manager is based on what may be referred to as a tag paradigm, which allows different types of information to be entered from a single screen display in a consistent manner, and likewise allows different types of information to be retrieved from a single screen display in a consistent manner. The operational modes characteristic of prior art personal information managers are largely eliminated, greatly increasing ease of use.

32 Claims, 12 Drawing Sheets

PERSONAL INFORMATION MANAGER INFORMATION ENTRY ALLOWING FOR INTERMINGLING OF ITEMS BELONGING TO DIFFERENT CATEGORIES WITHIN A SINGLE UNIFIED VIEW

This application is a continuation of application Ser. No. 08/394,487, filed Feb. 27, 1995, now abandoned.

BACKGROUND OF THE INVENTION

1. Field of the Invention

The present invention relates to personal information managers, i.e., devices for organizing various types of information including appointments, expenses, telephone and address information, lists including to-do lists, etc.

2. State of the Art

As computing devices have become smaller, personal information managers of the type described have become commonplace. Some personal information managers are specially-designed, stand-alone devices (e.g., Sharp's Wizard™, Casio's Boss™). Other personal information managers are application programs designed to run on general-purpose computing devices, for example desktop, notebook, sub-notebook, or handheld personal computers (e.g., HP200LX, Psion 3a), or personal digital assistants (PDAs) such as the Newton™ and the Zoomer™ PDAs (made by Apple Computer and Casio Electronics, respectively). More recently, Personal Intelligent Communicators (PICs) having telecommunications capabilities have become available (e.g., Sony's Magic Link™, Motorola's Envoy™ and IBM's Simon™). The latter devices combine the functions of a personal information manager with those of a telephone, pager, or other telecommunications device.

The evolution of personal information managers has been based largely on the paper/pencil paradigm. That is, the first personal information managers attempted to mimic on a personal computer the organization and interaction of familiar looseleaf organizers. As personal information managers have migrated to handheld devices and PDAs, the same paper/pencil paradigm has been largely adhered to.

One example of such a personal information manager is found in U.S. Pat. No. 5,237,651, entitled ELECTRONIC PERSONAL ORGANIZER, incorporated herein by reference. The electronic personal organizer described therein electronically displays graphics representative of pages of a loose-leaf booklet or binder arranged into various sections on a display screen. User input to the organizer is accomplished through a stylus and an input tablet or transducer pad sensitive to pressure or position of the stylus. Input and storage of user-generated graphics, notes, addresses, messages, etc., is provided for through various user-selectable operational modes. For example, to look up an address, an "address operational mode" is entered by positioning the stylus within the displayed PHONE tab. The organizer then operates as an address book by displaying representational graphics depicting a conventional organizer open at its address section. The edges of a sheath of pages are displayed beneath a front page having a tab indexed by the letter "A". Further tabs are shown defining sections of the sheath and each marked by a letter of the alphabet. The address book is opened to the appropriate section by positioning the stylus within the area of the desired tab. Pages are then "leafed through" using page forward and page back commands until the desired address is located.

Other conventional electronic organizers, although they may not display graphics representative of pages of a loose-leaf booklet or binder, are typically still based on the same underlying paper/pencil paradigm. In many instances, conventional elements of a graphic user interface, such as pull-down menus, buttons, etc., are used. Nevertheless, characteristically, different types of information, such as phone/address information, appointments, to-do lists, expenses, etc., are entered in separate "sections" of the personal information manager in accordance with the paper/pencil paradigm.

Under the paper/pencil paradigm, creation of a full-featured personal information manager results in the proliferation of "operational modes" in which a user must navigate through a succession of as many as five or more screen displays before arriving at a point at which the desired information can be entered or viewed. Furthermore, in each operational mode, information may be input and retrieved differently. As a result, known personal information managers are unduly complex and unwieldy, with conceptually simple data manipulations requiring a considerable amount of manual and mental effort on the part of the user.

A need therefore exists for a personal information manager that is simpler and easier to use. The present invention addresses this need.

SUMMARY OF THE INVENTION

The present invention, generally speaking, provides for a personal information manager based on a different paradigm than the conventional paper/pencil paradigm, resulting in a personal information manager that is dramatically simpler and easier to use. The personal information manager is based on what may be referred to as a tag paradigm, which allows different types of information to be entered from a single screen display in a consistent manner, and likewise allows different types of information to be retrieved from a single screen display in a consistent manner. No separate sections are necessary. The operational modes characteristic of prior art personal information managers are largely eliminated, greatly increasing ease of use.

As compared to more general-purpose information appliances, the present personal information manager is application-specific; that is, it does one thing (organize calendar, telephone, and list information of various kinds) and does it very well. The personal information manager performs its functions in a single, consistent, simple way. The user is presented with just one main screen display to perform all calendar functions. This one-screen organization makes the present personal information manager extremely easy to use, allowing the user: to make entries on one main screen without any complex navigation through a succession of screen displays; enter different types of information (to-dos, appointments, expenses) on one screen in one consistent manner; retrieve different types of information one screen in one consistent manner; and view a single day's or week's appointments, to-dos, expenses and logs at a glance.

BRIEF DESCRIPTION OF THE DRAWING

The present invention may be further understood from the following description in conjunction with the appended drawing. In the drawing:

FIG. 5 is an example of a pop-up screen display used to make a tag entry;

FIG. 6 is an example of a pop-up screen display used to make a text entry following entry of a tag indicating dollar-amount information;

FIG. 9 is an example of a pop-up screen display used to repeat an entry on a periodic basis;

FIG. 10 is an example of a pop-up screen display used to perform calculations;

FIG. 13 is an example of a pop-up screen display used to select a particular calendar year and/or month;

FIG. 14 is an example of a screen display used to view entries within a span of day occupying part of a week;

DETAILED DESCRIPTION OF THE PREFERRED EMBODIMENTS

Figure 1:
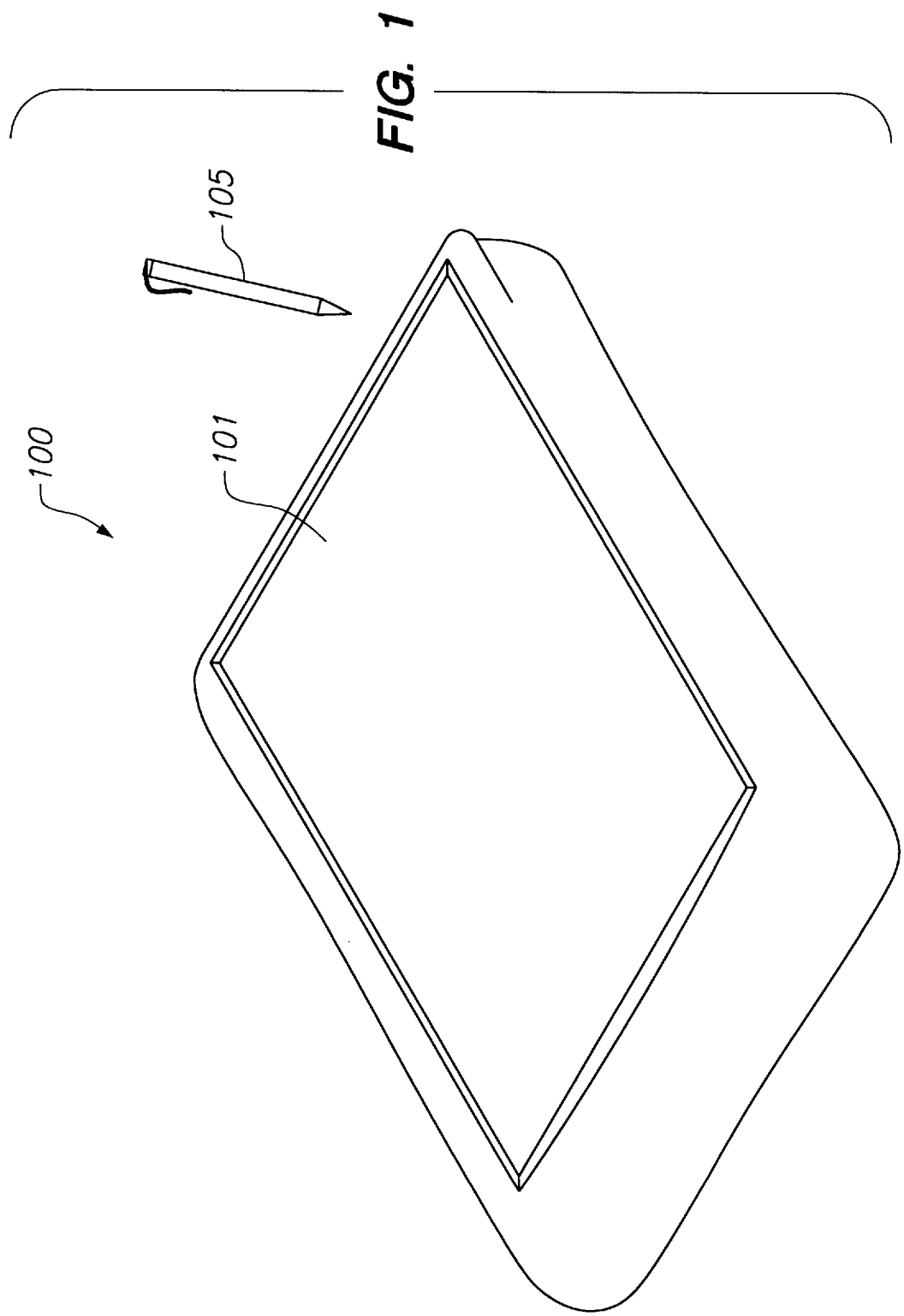
FIG. 1 is perspective view of a computing device with which the present personal information manager may be used.

Referring now to FIG. 1, a computing device 100 suitable for use with the present personal information manager is shown. The computing device 100 is shown as being a hand-held, pen-based computer, or PDA, having an LCD touch-screen display 101 and a stylus 105. Although the present invention will, for convenience, be described in terms of such a computing device, it should be understood that the invention is applicable to personal information manager software running on personal computing devices of various descriptions, including desktop computers, laptops, notebooks, sub-notebooks, PDAs, etc.

Figure 2:
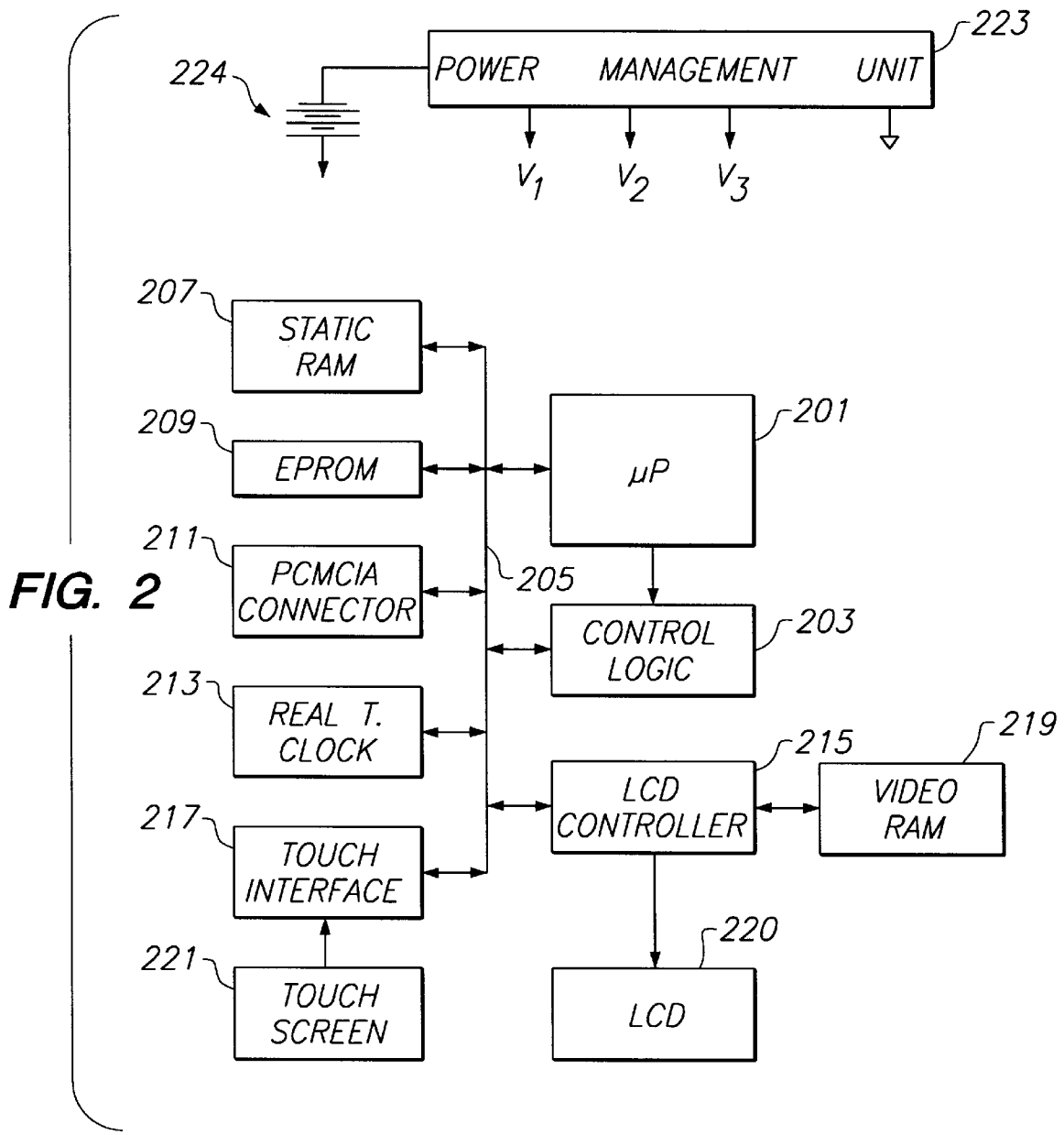
FIG. 2 is a block diagram of the computing device of FIG. 1.

Referring to FIG. 2, in one exemplary embodiment, the computing device 100 of FIG. 1 includes a microprocessor 201 and, connected to the microprocessor 201, control logic 203. Together, the microprocessor 201 and the control logic 203 make up the device "core." The microprocessor 201 and the control logic 203 are connected to a central bus 205 including address, data and control lines. Also connected to the bus 205 are memory devices, including a static RAM 207 and an EPROM 209, a PCMCIA connector 211, a real-time clock 213, an LCD controller 215 and a touch-screen interface 217. The LCD controller 215 is connected in turn to video RAM 219 and the LCD display 220. The touch-screen interface 217 is connected to a touch-screen 221. Together, the LCD display 220 and the touch-screen 221 form the LDC touch-screen display 101 of FIG. 1.

Power to each of the foregoing devices is supplied by a power management unit 223 from a battery 224. In the illustrated embodiment, the power management unit 223 produces three different operating voltages for use by various ones of the devices.

As contrasted with prior-art personal information managers based on the traditional paper/pencil paradigm, the present personal information manager is based on what may be referred to as a tag paradigm, which allows different types of information to be entered and from a single screen display in a consistent manner, and likewise allows different types of information to be retrieved from a single screen display in a consistent manner. The tag paradigm, and the ease-of-use it promotes, may best be understood from a description of a user's interaction with the personal information manager.

In a preferred embodiment, the personal information manager is used with a touch-screen device. Screen displays are presented to the user, in response to which the user touches the screen to command an action by the device. A "home-screen" of the present personal information manager is shown in FIG. 3 and, with certain exceptions described below, serves as the starting point for all or most user interactions with the personal information manager.

Figure 3:
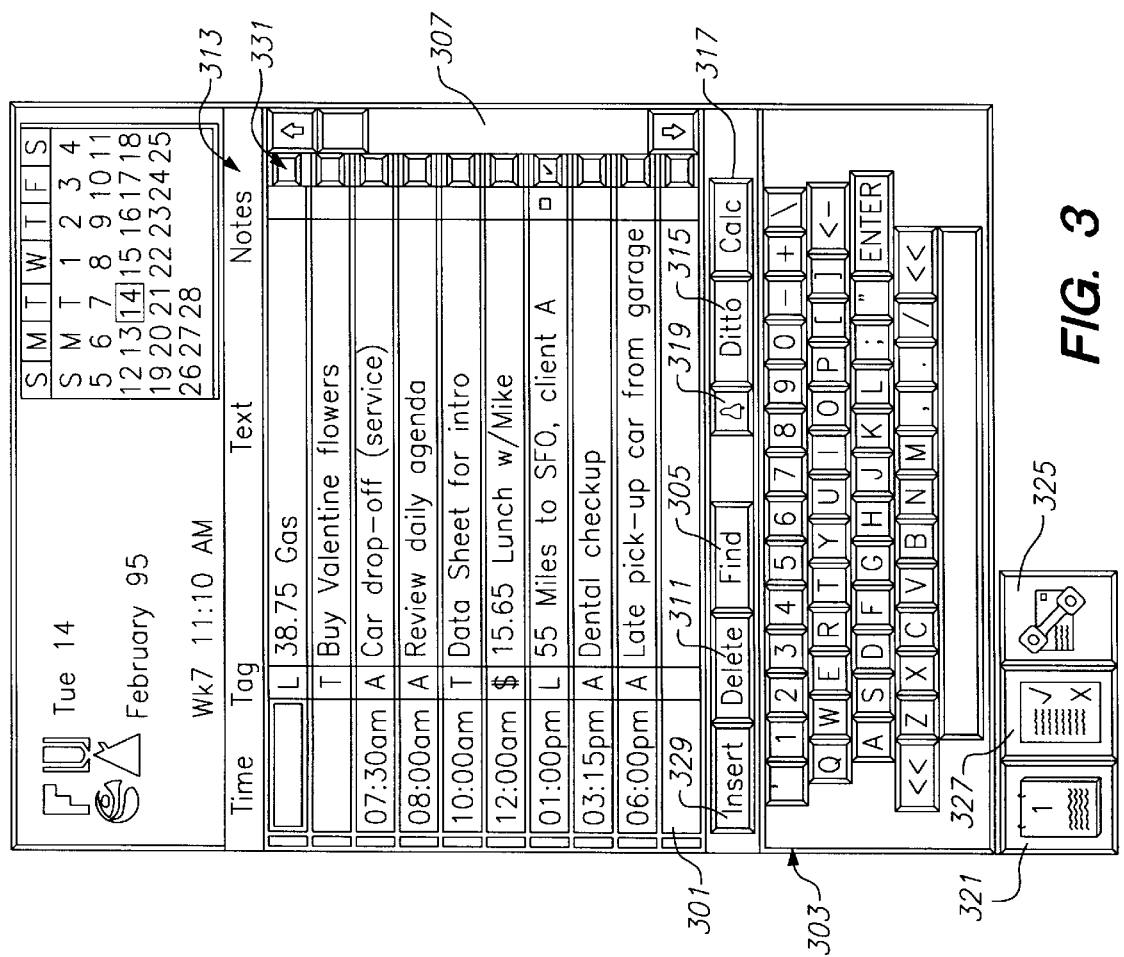
FIG. 3 is an example of a screen display from which different types of information may be entered.

A principal feature of the screen display of FIG. 3 is column of lines labelled "TAG." These lines are used to enter a tag for most (if not all) entries, in accordance with the tag paradigm to be presently described. A column labelled "TIME" precedes the TAG column, and a column labelled "TEXT" follows. A fourth column used to enter notes and a fifth "check-box" column also appear, but are used primarily for convenience and are not essential.

When making an entry in the personal information manager, the user first enters a time, if applicable, for example the time of an appointment or a time to do a particular task, or the time of an event during which an expense was incurred. To do so, the user touches the screen within the TIME column of the line 301.

Figure 4:
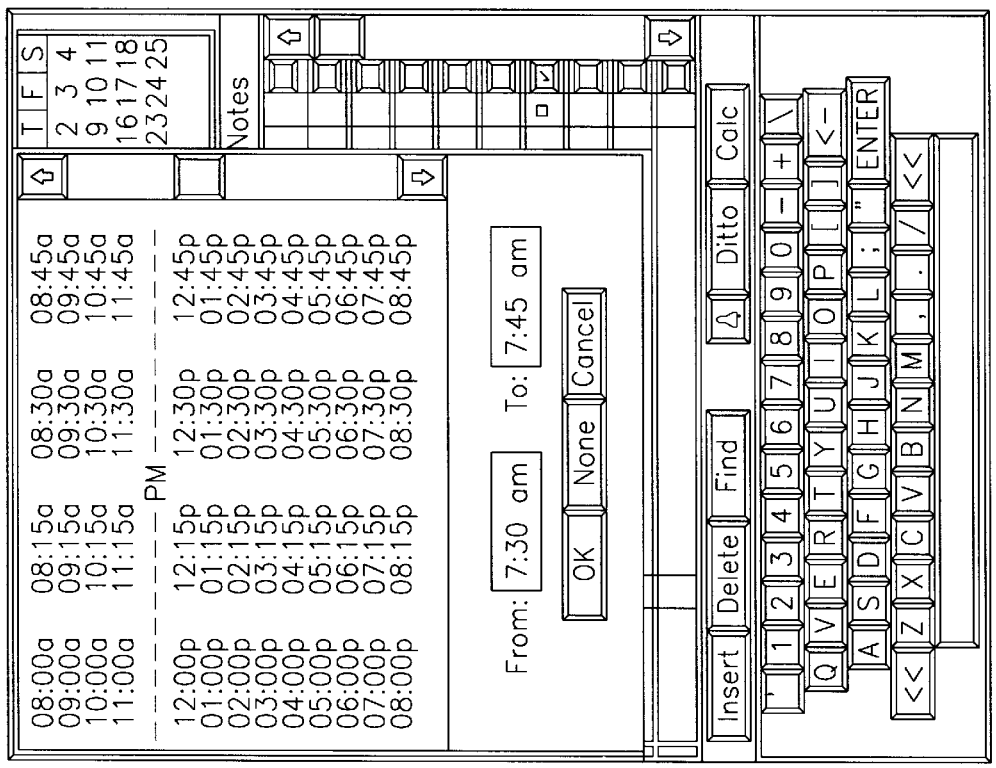
FIG. 4 is an example of a pop-up screen display used to make a time entry.

To provide for instances in which new data must be entered (instead of merely selecting a previous entry from a pop-up screen display, for example), a standard keyboard is displayed in an area 303 of the screen display. In large part, however, the manner of entering data within a particular data field uses pop-up screen displays and is context-sensitive. For example, when a time is to be entered, the context changes, causing a time-table pop-up screen display, illustrated in FIG. 4, to be displayed. A block of time is specified by dragging the stylus from a selected starting time to a selected ending time. The selected starting time will then be displayed in the time field (previously empty) selected by the user. To avoid an excess of detail, the selected ending time is not normally displayed, but may be displayed by once again selecting the time field by touching within it, causing the time-table pop-up screen display to again appear, having the time from the starting time to the ending time displayed.

In some instances, there will not be any time entry associated with a particular item of information. For example, one might list a project to be performed on a particular day but not specify any particular time. The time field may then be skipped by selecting the tag field directly. The time field is then left blank.

Once a time has been entered, if applicable, the user next enters a tag. A tag identifies an entry as being of a particular type. For example, a tag denoted by the letter A (or by an appropriate icon) may identify an entry as an appointment. Similarly, a tag L may identify an entry as a log entry, and a tag T may identify an entry as a "to-do" entry. A tag $ may identify an entry as an expense account entry. Each of the foregoing tags may be represented by icons instead of letter designations. Although these tags are exemplary of tags likely to be most often used by a typical user, other tags may be defined by the user. Tags provide a powerful way of both entering and retrieving information from the personal information manager without entering different operational modes or navigating through a deep hierarchy of screen displays.

To facilitate entry of a tag, once again, a context-sensitive display is used. Once the tag field has been selected, using a stylus or, in other embodiments, a cursor, entries corresponding to each of the defined tags are displayed within a pop-up screen display, shown in FIG. 5. By touching the appropriate display region, a tag is selected and entered in the active field.

Figures 5, 6:
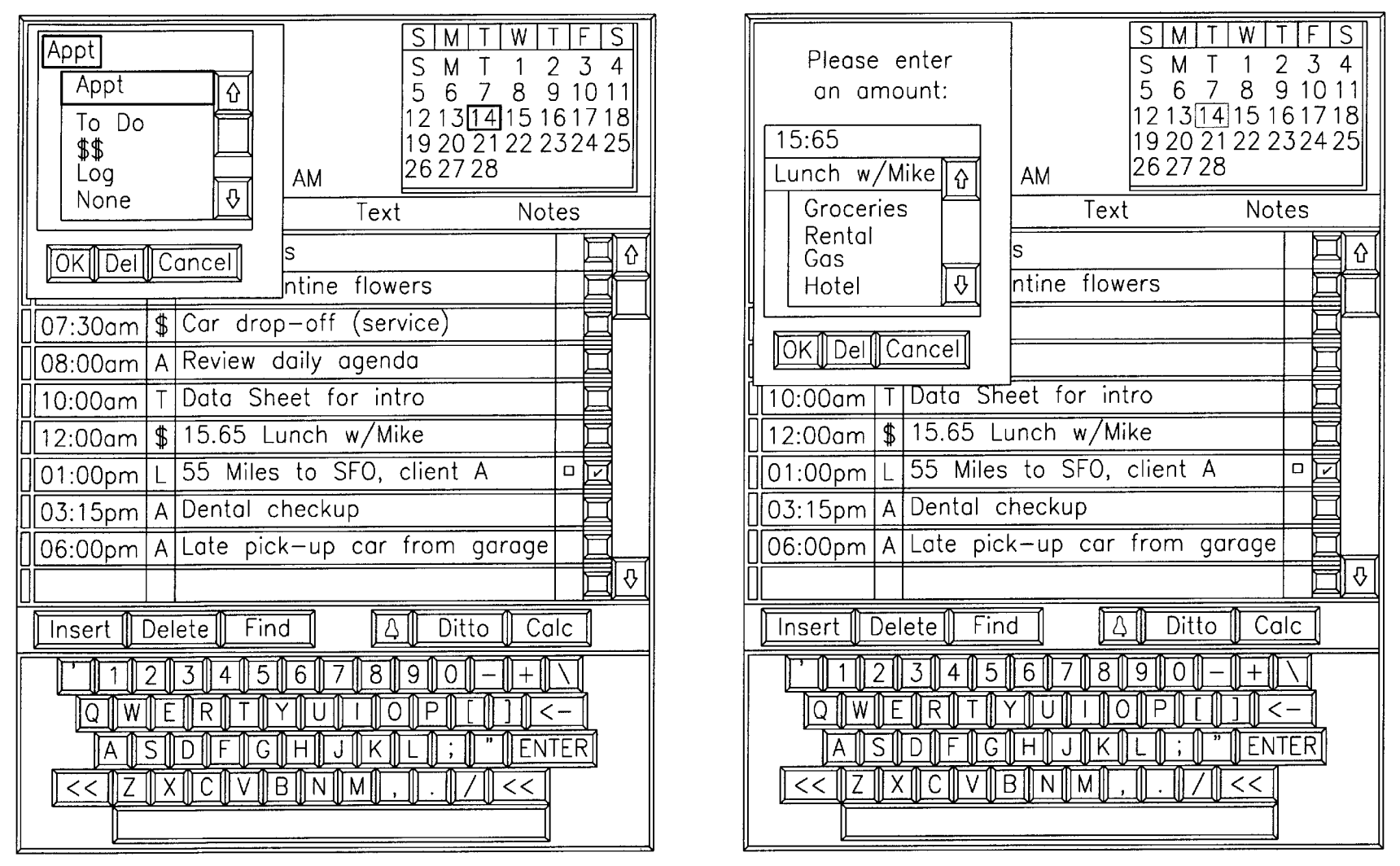

There still remains to enter an actual textual description of the item of information being entered. For this purpose, a different pop-up screen display is displayed depending on which tag was previously selected. Referring to FIG. 6, if the dollar-amount tag $ was previously selected, for example, a list is then displayed of text entries currently available for that tag—groceries, rental, gas, hotel, etc. First, the user enters an amount. Then, if one of the descriptions already displayed fits the current entry, it may be entered in the text field of FIG. 3 along with the entered amount by simply touching within the appropriate area in FIG. 6. If none of the descriptions fits the current entry, then the user may proceed to enter (using the keyboard) a new text description, which is then added to the FIG. 6 list for future use.

Figure 7:
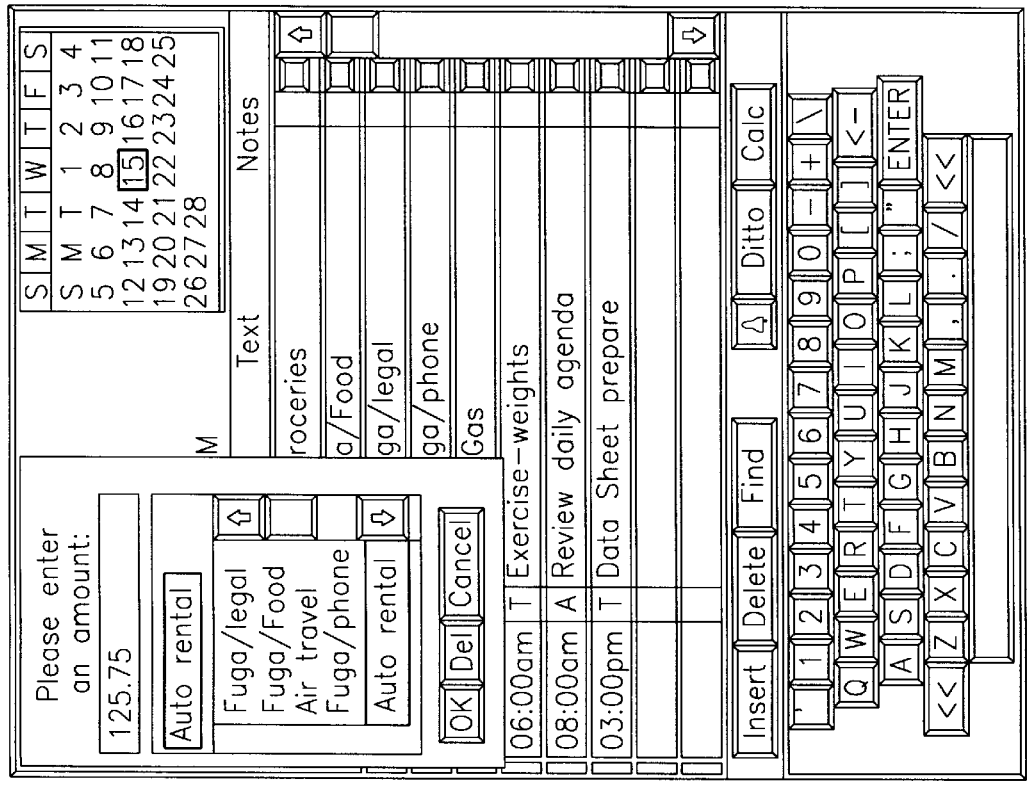
FIG. 7 is an example of a pop-up screen display used to make a text entry following entry of a tag indicating log information.

To take a different example, if the log tag L was previously selected, then a list is then displayed of text entries currently available for that tag—legal expenses, food and entertainment, air travel, phone, etc.—as shown in FIG. 7. The user first enters an amount and then either touches one of the entries already displayed or creates a new entry. The amount information entered by the user and the text information selected or entered by the user are then dropped into the calendar display of FIG. 3.

Figure 12:
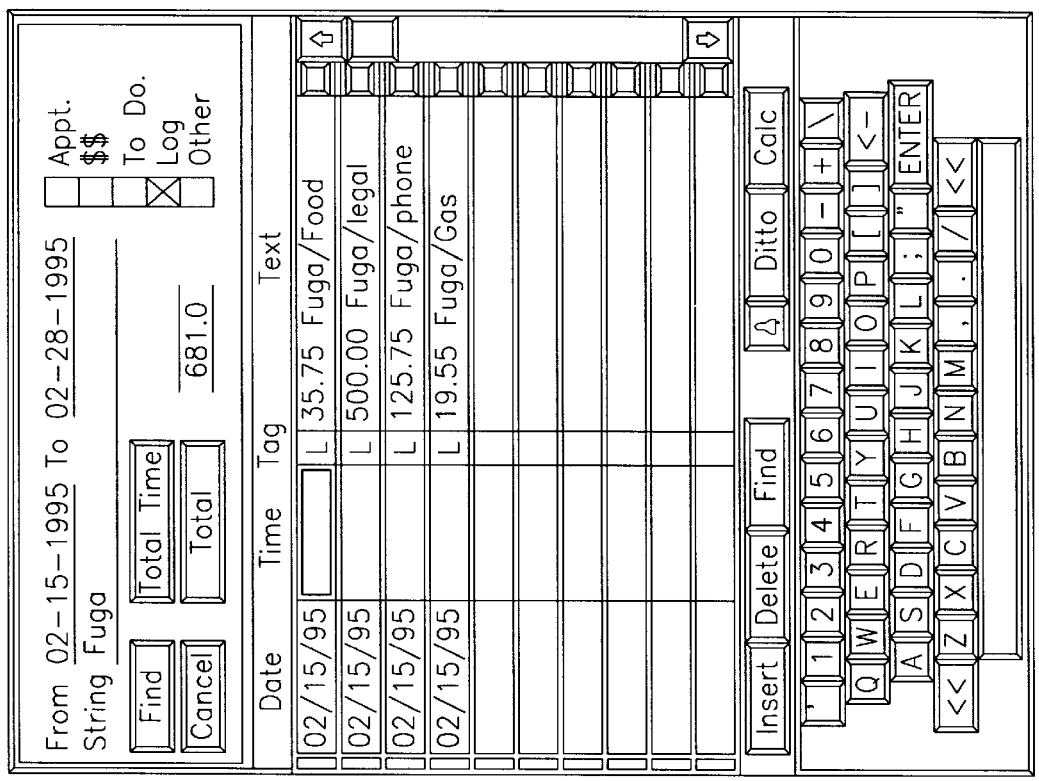
FIG. 12 is an example of a pop-up screen display from which different types of information may be retrieved.

Just as the use of tags greatly simplifies and accelerates the entry of information, so also the use of tags greatly simplifies and accelerates the search and retrieval of information. A search is initiated by touching the "Find" button 305 in FIG. 3. A screen display such as that of FIG. 12 is then displayed. Information may be searched by date, tag, text, or any combination of the same. To perform a date-limited search, the user enters (using the keyboard) a date range bracketed by a "From" date (day, month and year) and a "To" date (day, month and year). To search for entries containing particular text, the user enters a text string. Alternatively, if text has previously been selected within the screen display of FIG. 3, that text will automatically be entered in the "String" search field. To search for entries of a particular tag type or a subset of tag types, the user touches one or more of the boxes corresponding to the different tags or may type the first letter of a tag in the "Other" field.

Changes may be made by selecting and "typing over" text or by touching a different tag to select it. Once the search parameters have been defined to the user's satisfaction, the Find button is selected. A database (stored in static RAM 207 of FIG. 2) is then searched, and all matching entries are retrieved and displayed using the screen display of FIG. 3. Numerical entries may be totalled by touching the "Total" button in FIG. 12. The matching entries are then totalled and the total displayed next to the Total button. Also, the total time of matching entries may be determined by selecting the "Total Time" button in FIG. 12. For example, the user may wish to know the total time spent meeting with a particular party during a given interval. The total time may be readily determined using the Total Time button.

If no From and To dates are entered, these values default to the present day. A user may wish to view only those entries for the present day having a particular tag. This may be accomplished by selecting that tag within the Find pop-up screen display. For example, on a particular day, the user may have a breakfast appointment at 8:00 AM followed by a lengthy list of to-do items, followed later in the afternoon by further appointments at 3:00 and 4:00 PM. By selecting the appointment tag within the Find pop-up screen display and selecting Find, all of the appointments for the day, and appointments only, may be viewed.

In each instance, the basic operation for searching the database is to find a set of entries that match user-determined criteria.

The following examples demonstrate the usefulness of the Find function:

(1) Find out when you met with an important contact at IBM

From/To=Jan. 1, 1995–Dec. 31, 1995

String=IBM

No tag selected (or maybe "A")

(2) Find out when you had a dental appointment

From/To=Jan. 1, 1995–Dec. 31, 1995

String=dental

No tag selected (or maybe "A")

(3) Find out when you are up for annual renewals

From/To=Jan. 1, 1995–Dec. 31, 1995

String=renewals (or car insurance, or car registration, or health insurance)

No tag selected (4) Find out when you attended some main event in 1995

From/To=Jan. 1, 1995–Dec. 31, 1995

String=conferences (or musicology, or pc expo, or board meeting)

No tag selected

The following examples demonstrate the usefulness of the compute function for appointments and to-dos:

(1) Find out total time spent in exercises

From/To=Feb. 1, 1995–Feb. 28, 1995

String=exercise (or weights, or aerobics, or stretches)

No tag selected (or maybe "T")

Click on total time button (2) Find out total time spent in meetings with Boss

From/To=Feb. 1, 1995–Feb. 28, 1995

String=Boss

No tag selected (or maybe "A")

Click on total time button (3) Find out total time spent in doing a certain task From/To=Feb. 1, 1995–Feb. 28, 1995

String=data sheet

No tag selected (or maybe "T")

Click on total time button

The following examples demonstrate the usefulness of the compute function for dollar amounts ($) and log entries (L):

(1) Find out total time spent on client A (for billing)

From/To=Feb. 1, 1995–Feb. 28, 1995

String=client A

No tag selected (will retrieve both "A" and "L" items)

Click on total time button (2) Find out total amount spent on Fuga expenses for February 1995

From/To=Feb. 1, 1995–Feb. 28, 1995

String=Fuga (or further categories)

Tag=L

Click on total button (3) Find out total amount spent on business travel February 20–23

From/To=Feb. 20, 1995–Feb. 23, 1995

String="" (or further categories such as food, air travel, hotel, taxi, customer entertainment)

Tag=L

Click on total button

The following example demonstrates the usefulness of a user-definable category, e.g. "Project A" (tag=P).

(1) Find out details on Project A

From/To=Jan. 1, 1995–Dec. 30, 1995

String="" (or business, client list, distribution)

Tag=P (other)

Click on total time button

Referring again to FIG. 3, the check-off column 331 may be used to check-off items, such as to-do items and appointments, as they are completed. To-do items that remain uncompleted at the end of the day are "rolled-over" to the next day, without specifying any particular time. Entries not having times specified are displayed first followed, in chronological order, by entries not having times specified. Entries besides those currently displayed may be viewed by scrolling up or down using scroll buttons/scroll bar 307. If an entry displayed on the screen is too long to fit entirely on the screen, the arrow buttons on the keyboard may be used to scroll horizontally.

Entries may also be changed or deleted entirely. One or more fields of an entry may be changed by selecting a field to be changed and then re-inputting or correcting the field. An entire entry may be deleted by selecting any field within that entry and touching a delete button 311. To insert an entry below an existing entry, a field within the entry is selected, after which an insert button 329 is selected. Beneath the selected entry, a blank line is then inserted, which may then be used to make an entry in the usual manner.

Figure 8:
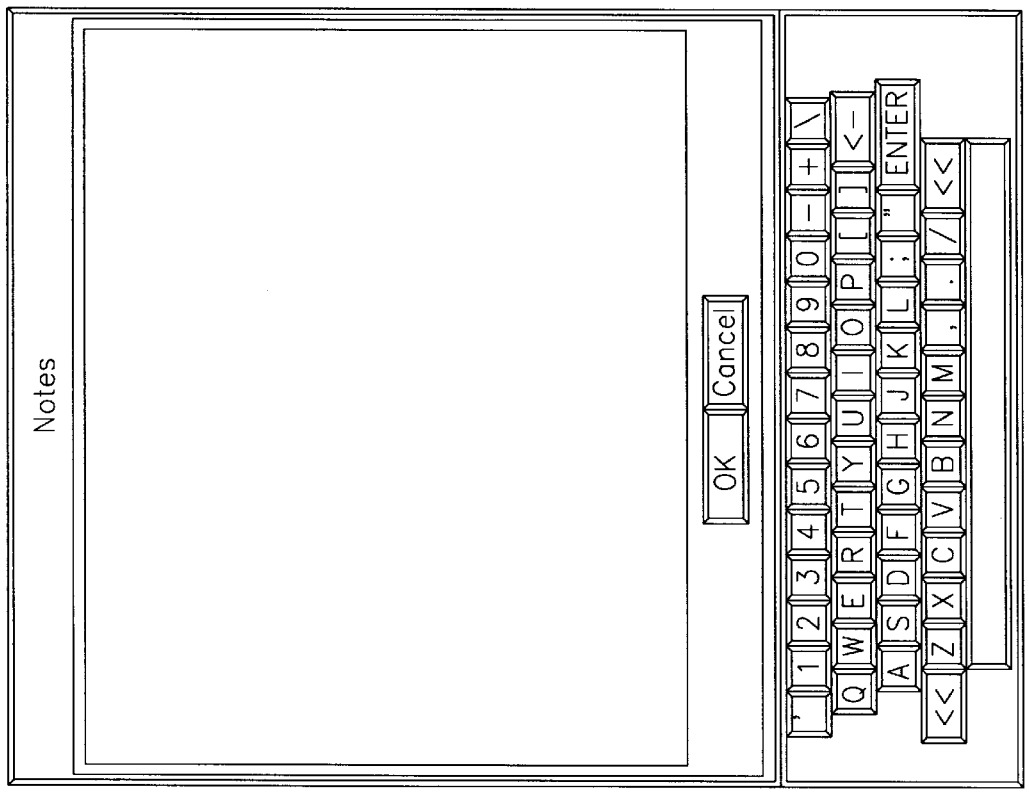
FIG. 8 is an example of a pop-up screen display used to add an additional notation to a text entry.

In many instances, a user will wish to store several lines of text associated with an item, more than is practical to store within the text field itself. For this purpose, a notes facility is provided. A note associated with an entry may be entered by selecting a field within a column 313. A screen display such as that of FIG. 8 is then displayed, providing a window in which additional text may be entered. The user, when finished entering text, touches the OK button. The screen display of FIG. 8 is then closed, and a marker is displayed within the notes field to indicate the existence of a note. The window of FIG. 8 allows any amount of text to be entered up to a predetermined number of characters.

Figures 9, 10:
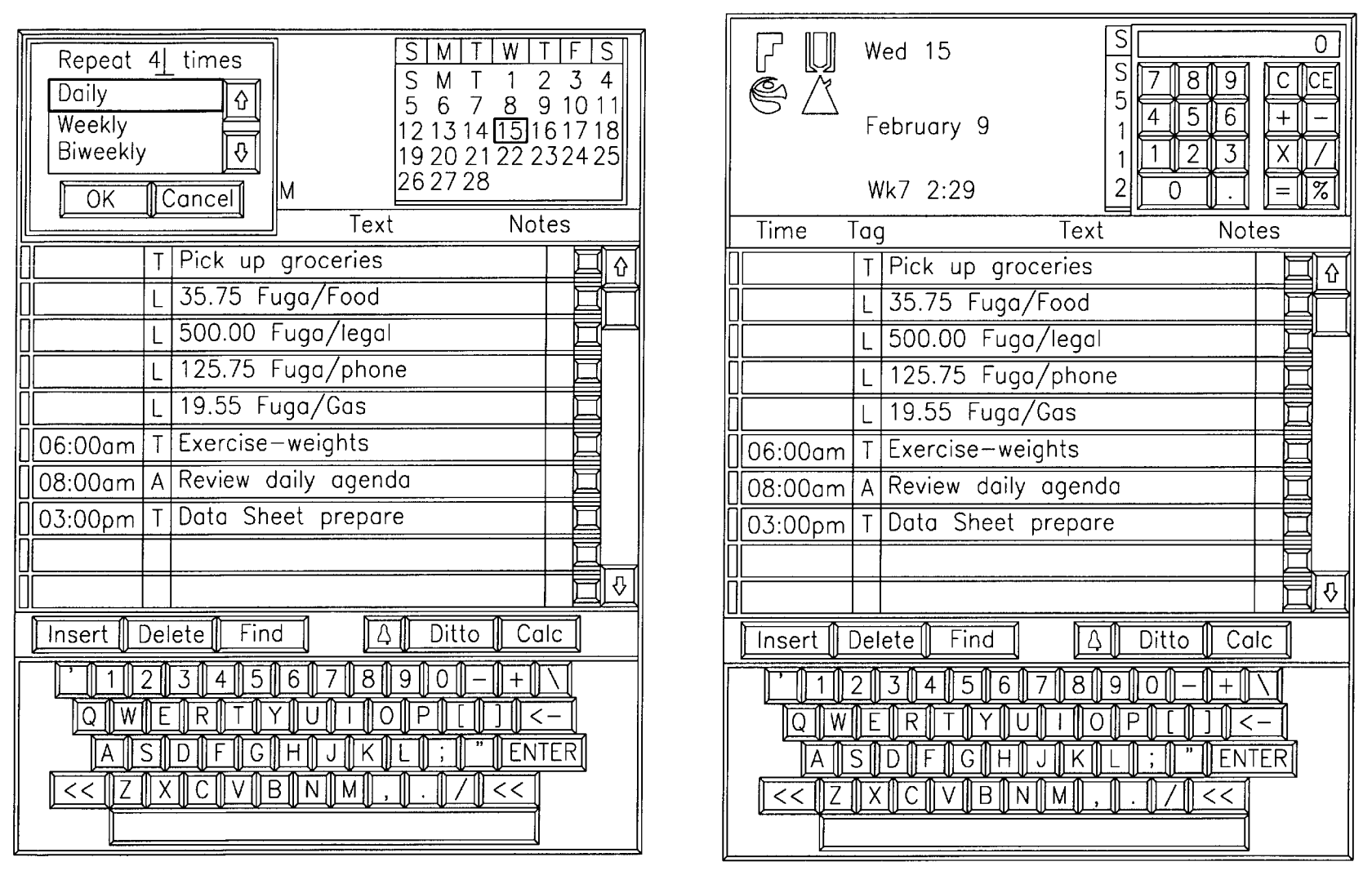

The user may also wish to repeat an entry at daily, bimonthly, monthly or yearly intervals. For example, a particular business meeting might be held every week at the same time. Rather than make a separate entry each week, a facility is provided to repeat a selected entry at intervals. When a "Ditto" button 315 is touched, a screen display such as the one of FIG. 9 is displayed. The user then selects a repeat interval. The user may also specify that the entry is to be repeated a given number of intervals, for example each month for the next three months. The personal information manager then schedules repeated instances of the event at the selected interval.

In figuring expenses and performing other calculations, a calculator is often required. The personal information manager provides an on-screen calculator, obviating the need to carry a separate calculator. The calculator is displayed, for example as shown in FIG. 10, by touching the "Calc" button 317 in FIG. 3.

Figure 11:
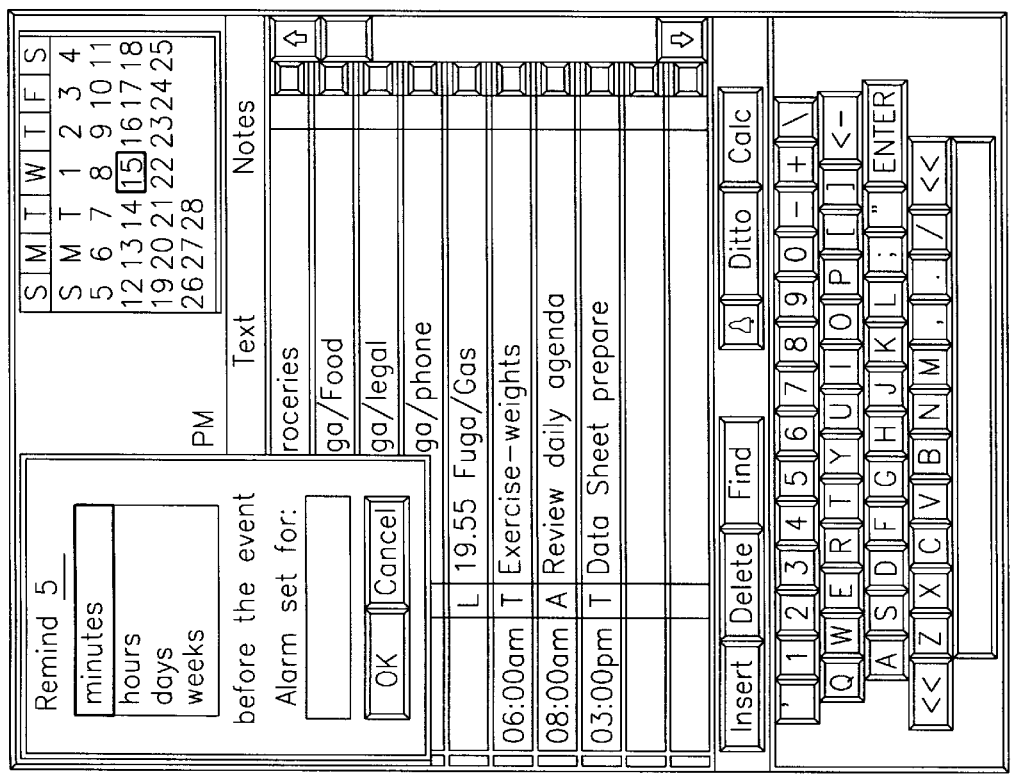
FIG. 11 is an example of a pop-up screen display used to schedule a reminder in advance of an event.

The personal information manager also provides a reminder facility, invoked by first selecting an entry and then touching the button 319 in FIG. 3. A screen display such as that of FIG. 11 is then displayed. The user sets an alarm to be reminded of the selected event by entering a number and selecting a time unit, such as minutes, hours, days or weeks. In other embodiments, the user may also select a notification method. For example, if "Alarm" were selected, then, at the specified reminder time, an audible beep would be produced. If "Flash" were selected, then at the specified number of time units prior to the time of the selected entry, the entry would begin to be displayed in a flashing mode. If "Message" were selected, then, at the specified reminder time, a reminder message would be displayed on the main screen.

Throughout the foregoing discussion, it has been assumed that the personal information manager is being operated to display day-by-day events and entries. The time-tag-text entries are displayed when a calendar icon 321 is selected. Unless otherwise specified, the day displayed is the current day, displayed along with the current time at the top of the screen in FIG. 3. Also displayed at the top of the screen is a calendar of the current month.

Different days within the month may be selected by touching within that day on the calendar, upon which the screen display of FIG. 3 corresponding to the selected day is displayed. A week or a portion thereof may be selected by "swiping" the week on the month calendar. If fewer than seven days are swiped, then all entries belonging to the selected days are displayed in chronological order as shown in FIG. 14.

Figure 15:
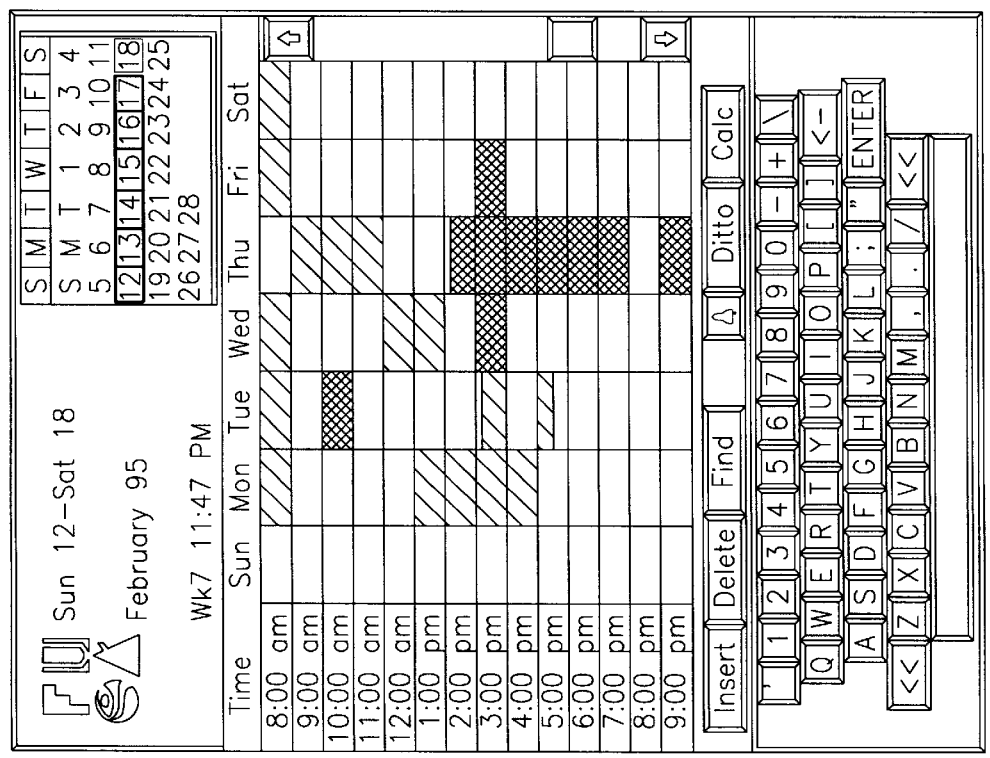
FIG. 15 is an example of a screen display used to view a particular week.

When the seven days of an entire week are swiped, the week is displayed in time-block fashion. An example of a "WEEK" screen display is shown in FIG. 15. A grid array is displayed, with a column for each day of the week and a row for each hour of a typical work day. Appointments, events and activities already scheduled during the displayed week are indicated by the corresponding time being shaded or highlighted.

Figures 13, 14:
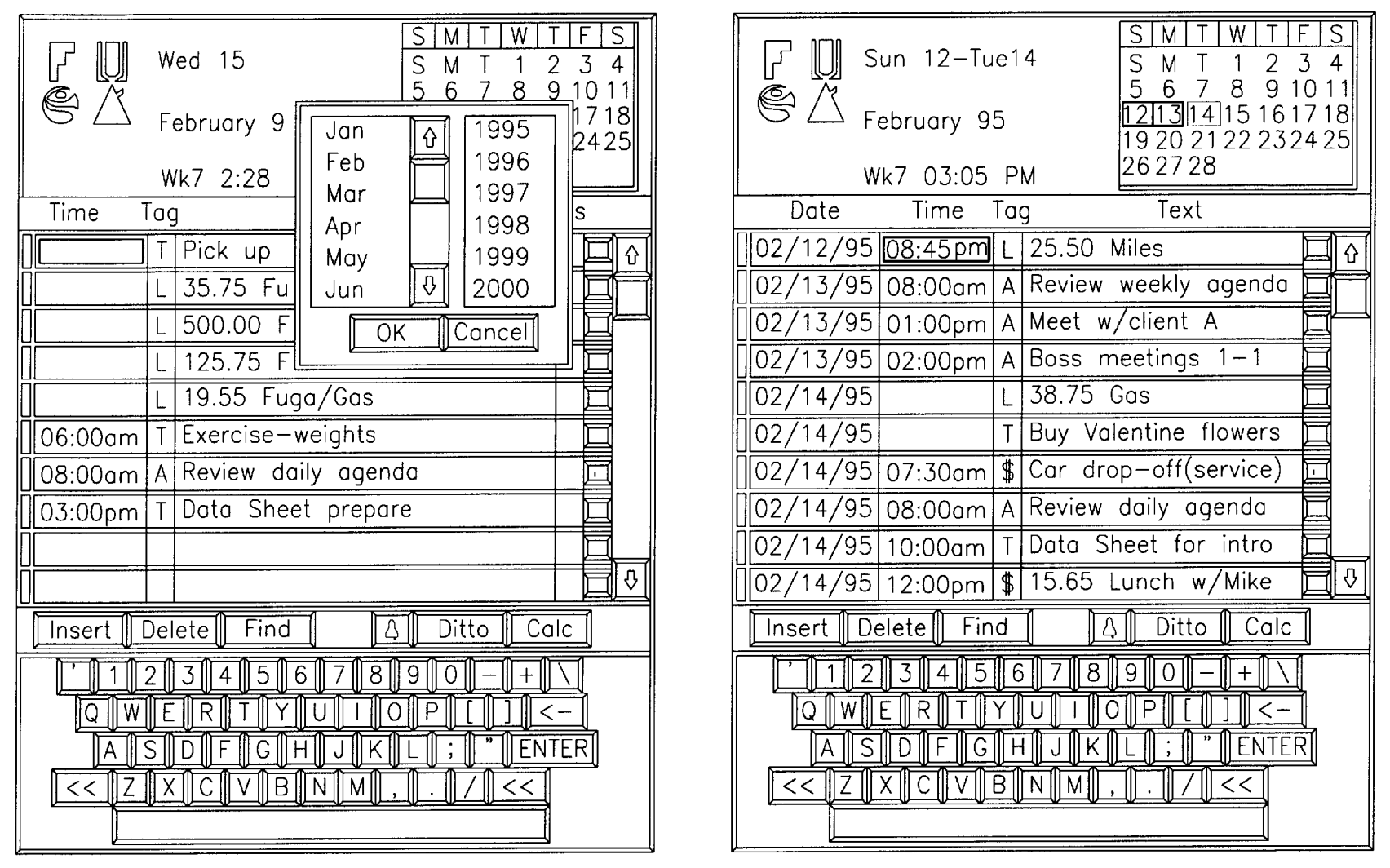

When the month or the year displayed in FIG. 3 is selected, a display such as that of FIG. 13 appears. The month may be changed by selecting within the "month" half of the screen and then using the scroll buttons to scroll to a different month. Similarly, the year may be changed by selecting within the "year" half of the screen and then using the scroll buttons to scroll to a different year.

Most personal organizers provide forms for a telephone/ address list as well as various other lists. The present personal information manager provides for such lists with the same characteristic convenience as operations heretofore described. The phone/address list facility will be described first, followed by the general lists facility.

Figure 16:
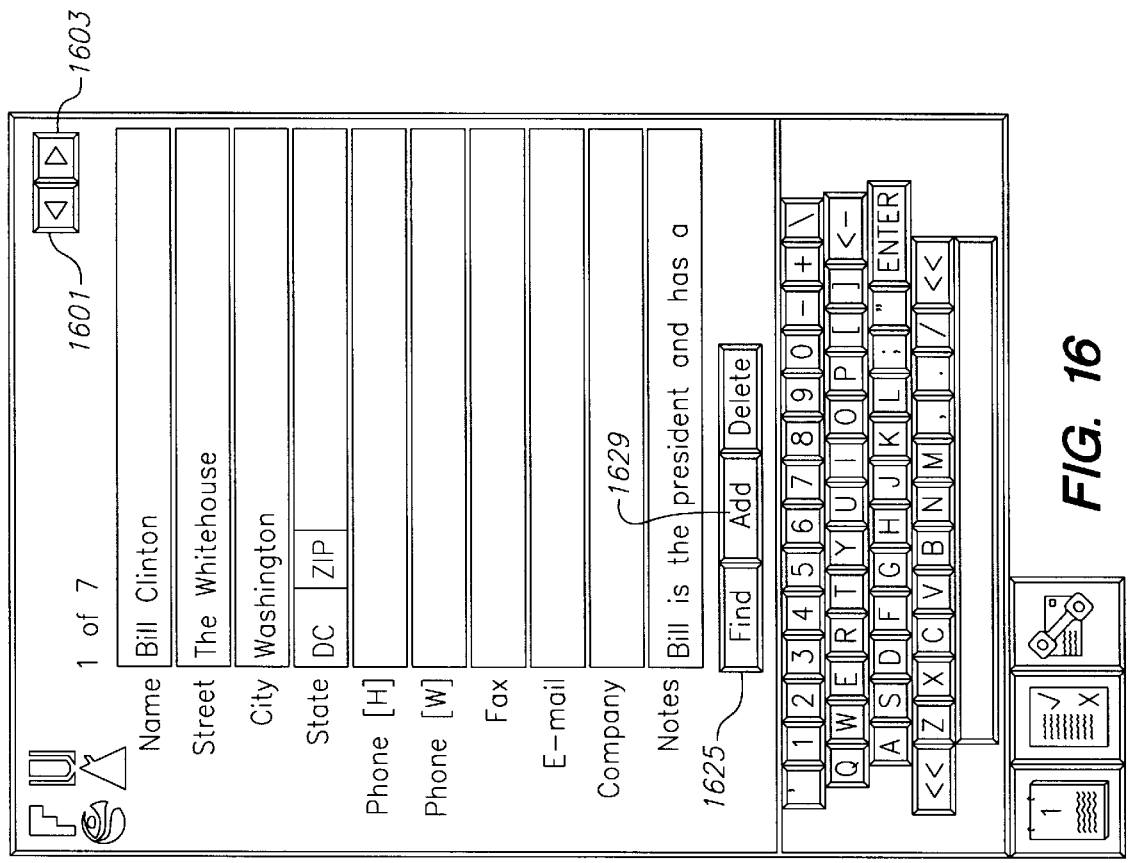
FIG. 16 is an example of a pop-up screen display used to view, change or add telephone and address information.

The phone/address list is entered by touching an icon 325 in FIG. 3. This action causes a screen such as the one of FIG. 16 to be displayed. The various fields shown in FIG. 16 are initially blank. A particular phone/address entry may be retrieved by entering at least a portion of the name of the person concerned, then touching a Find button 1625. The closest matching entry is then displayed. Entries may be viewed sequentially using buttons 1601 and 1603.

An existing entry may be changed by changing the contents of the various field as desired in the usual manner. Alternatively, a new entry may be created. When the screen is first displayed with blank field, the fields may be fill in to create a new entry. When the entry is correct, an "Add" button 1629 is touched, causing the entry to be stored.

For additional information that a user may wish to store relating to the individual named in the entry, a notes facility is provided in similar manner as previously described in relation to FIG. 3. A notes screen of the phone/address list facility is the same as that shown in FIG. 8.

Figure 17:
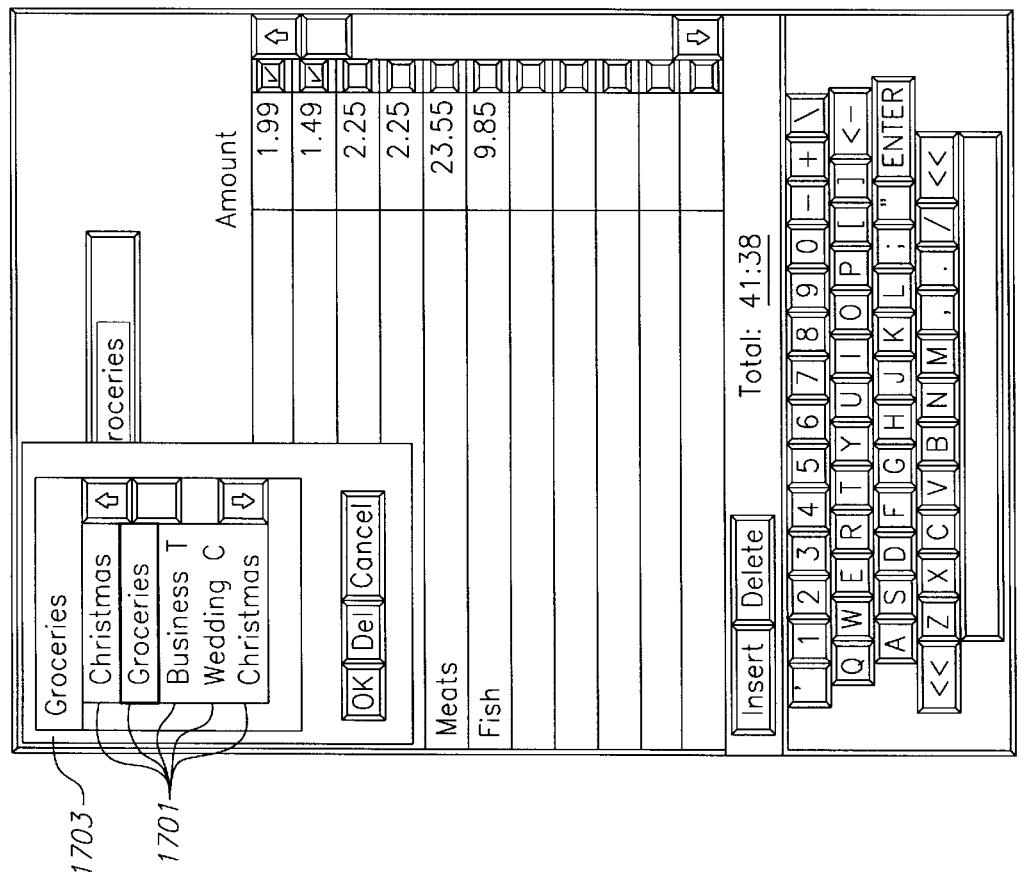
FIG. 17 is an example of a pop-up screen display used to maintain various lists.

Using a general lists facility, information of various descriptions may be stored in the form of "lists" created and named by the user. The general lists facility is entered by touching an icon 327 in FIG. 3, which causes a screen such as that of FIG. 17 to be displayed. Entries 1701, one for each list previously defined, are displayed, together with an field 1703, used to define a new type of list.

To display a previously-created list, one of the entries 1701 is touched. To define a new list, the user simply enters a name for the new list, using the displayed keyboard.

Figure 18:
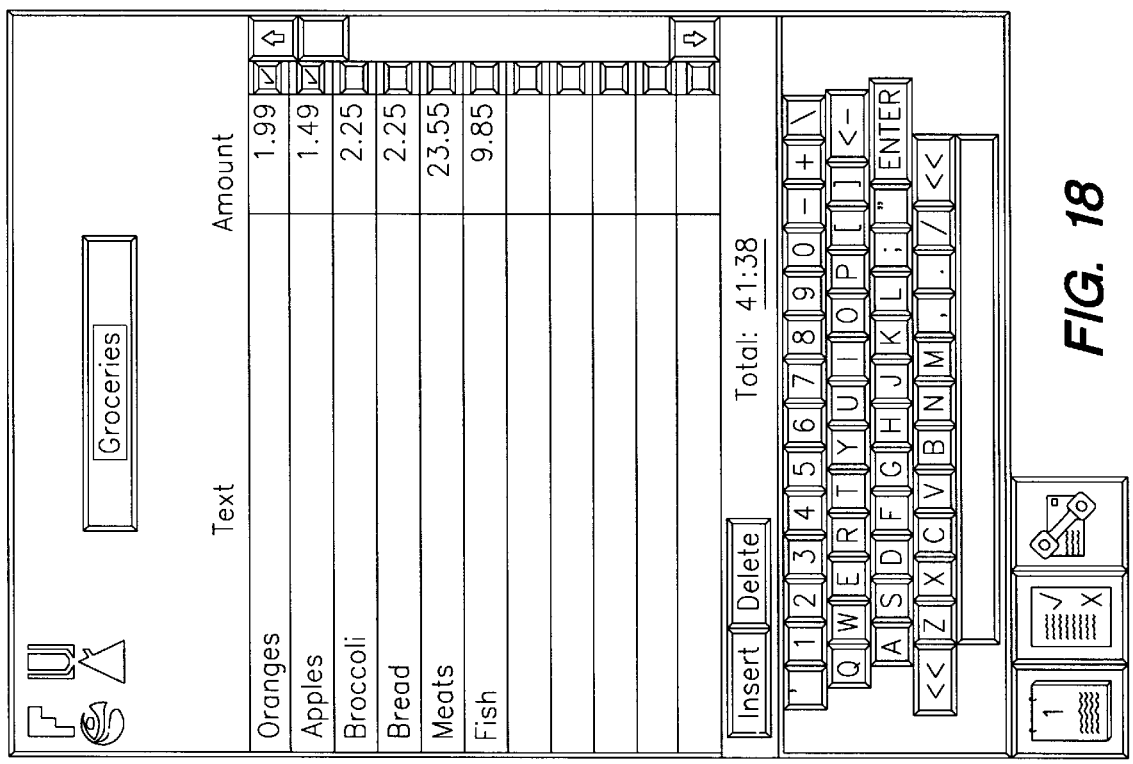
FIG. 18 is an example of a pop-up first screen display used in conjunction with the screen display of FIG. 17 to view, change or add a particular list (e.g., a grocery list)

Some lists may have an amount field. Such a list, assumed to have been previously created, is shown in FIG. 18 as a weekly grocery list. During (or after) grocery shopping, list entries are made for various items purchased, together with each item's price. A field is provided for the sum total of the listed prices, in which a running total is kept.

Because of the high degree of consistency of the manner of user interaction with the present personal information manager, described in relation to FIG. 3 through FIG. 18, ease-of-use is greatly enhanced.

Figure 19:
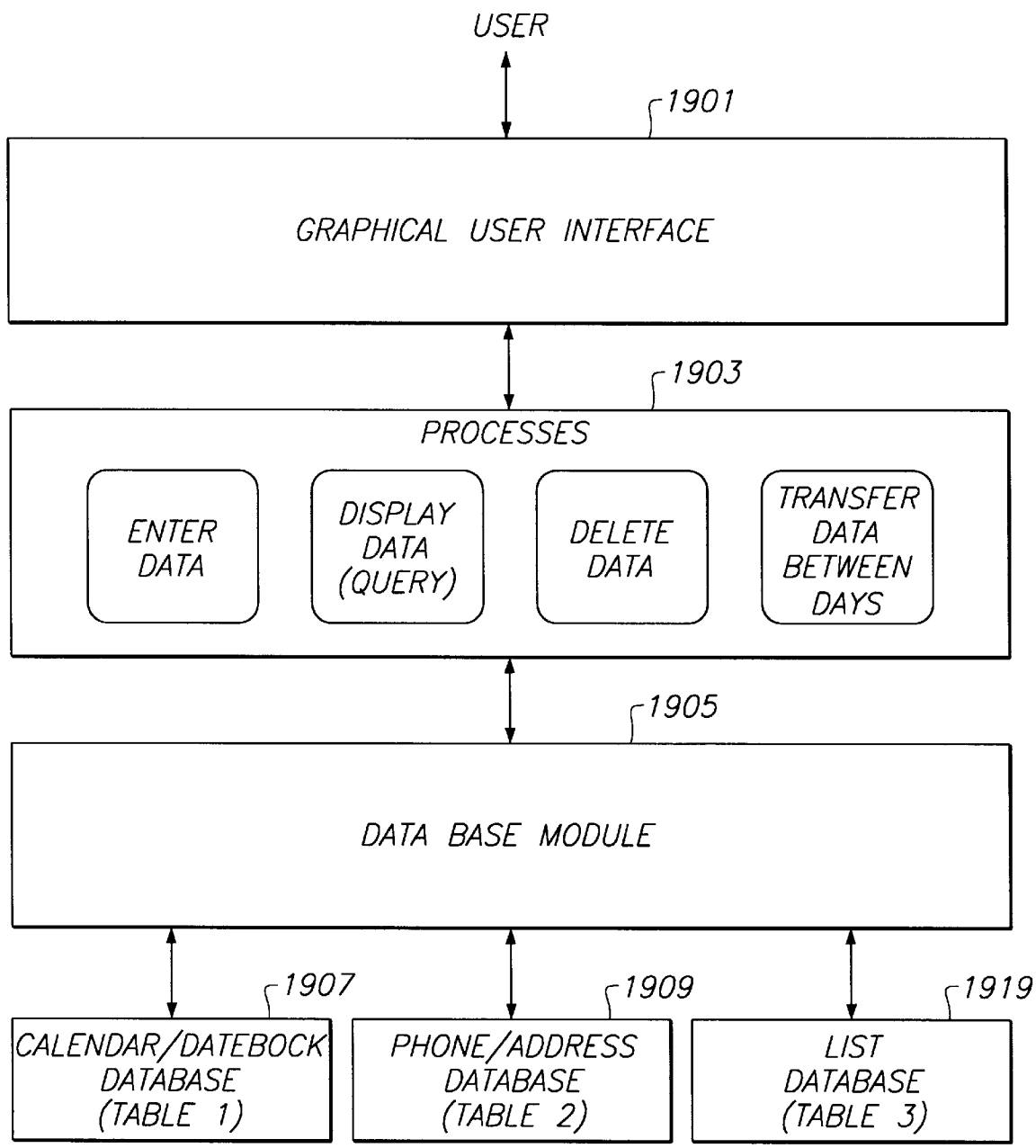
FIG. 19 is a diagram logical structures that may be used in implementing the present personal information manager.

The logical structure of one embodiment of the present personal information manger is illustrated in FIG. 19. User inputs are received by a graphical user interface (GUI) 1901, for example a pen-based GUI as described, or a conventional keyboard/mouse GUI. User inputs are detected as events and input to a main program 1903, consisting of a number of different processes, including a data entry process, a data display process, a data deletion process, and a process in which data is transferred between days.

The main program is event-driven; i.e., nothing happens until there is some user input. The only event that occurs without user input is a time-keeping function. At one minute intervals the time displayed on the screen is updated. The program checks to see if there are any entries with alarms that need to be displayed. Also, if the time is midnight, the program checks to see if there are any unchecked entries to be rolled over to the next day.

The main program interfaces to a database module 1905. The database module maintains and allows for searching of three databases, a calendar/databook database 1907, a phone/address database 1909, and a lists database 1919.

The basic informational unit of the calendar/databook database is the Entry, which is comprised of the following fields:

TABLE 1

| | |
|---|---|
| Date | The date of the entry (mandatory) |
| Start Time | The time at which it begins |
| End Time | The time at which it ends |
| Alarm | The time the corresponding alarm (if any) is set for |
| Tag | What type (Appointment, To Do, Log, Expense) |
| Text | The text itself |
| Amount | An amount corresponding to Log and Expense types |
| NB | A flag indicating the presence of additional notes |
| Notes | Additional notes (up to 255 characters) |
| Status | Whether the entry has been taken care of (checked off) |
| Copy | A flag indicating if this entry is a copy of another |
| Copy Exists | A flag indicating if a copy of this entity exists |

The foregoing entries are stored in a table and are indexed by date. The entries are displayed by means of a "grid" (i.e., display manager). Only the Start Time, Tag, Text, NB and Status fields are normally displayed. The other fields are hidden, and are only displayed in certain contexts.

The grid sends a query to the database requesting the entries to be displayed. Normally, the grid displays the entries of the currently selected date. When the Find panel is open, however, the grid displays the results of the Find query (e.g., all entries of type appointment, or all entries from a certain date to another).

The basic informational unit of the phone/address database is the Entry, which is comprised of the following fields:

TABLE 2

| | |
|---|---|
| Name | The name of the person (mandatory) |
| Street | The street the person lives on |
| City | The city the person lives in |
| State | The state |
| Zip | Zip code |
| Phone number (h) | Home phone number |
| Phone number (w) | Work phone number |
| Fax no. | Fax number |
| Email | Email address, if any |
| Company | Name of person's employer |
| Notes | Additional notes about the person (up to 255 characters) |

The foregoing entries are stored in a table and are indexed by name. Basic operations which are performed on this database are the adding of new entries, editing of existing entries, deletion, and searching of the database to find a set of entries that match user-determined criteria.

The list database may be a simple table having four types of entries, as follows:

TABLE 3

| | |
|---|---|
| Type (text) | The type of list (e.g., grocery, Christmas card) |
| Text | The text of the list |
| Amount (real) | Amount if any |
| Status | A flag marking whether the item has been checked off |

Searches can be performed in any of the databases by selecting a search string from a main screen. For example, the user might highlight the text "Bill" in the display of the calendar and then click on the phone/address button. This action will bring up Bill's personal information by sending a query to the addressbook database to bring up all records (perhaps more than one) that match Bill's name.

Similarly, the user might highlight "John" in the addressbook display and then click on calendar. Upon clicking Find, the program will automatically insert "John" in the search string. The user may then specify additional criteria, such as From/To date and Tag, to bring up selected entries for John on the main display of the calendar.

Similarly, one can highlight "groceries" (in a to-do item) in the calendar display and clock on Lists. This action will automatically bring up any "groceries" list. Or, when in Lists, one can highlight "groceries" and click on calendar. This action will automatically bring up the current date's calendar and the Find Panel with "groceries" inserted as the search string. Additional criteria may be specified such as From/To date and Tag, to bring up selected entries for groceries in the grid display of the calendar.

Finally, one might highlight "Jim" in an emergency names list (used to store names of people to inform during an emergency) and click on phone/addresses to retrieve Jim's personal information. Or, in the phone/addressbook, one might highlight "wines" (Jim's favorite drink recorded in the notes field) and click on lists. This action will automatically bring up any "wines" list (e.g., the top 10 gourmet wines of 1995).

Figure 20:
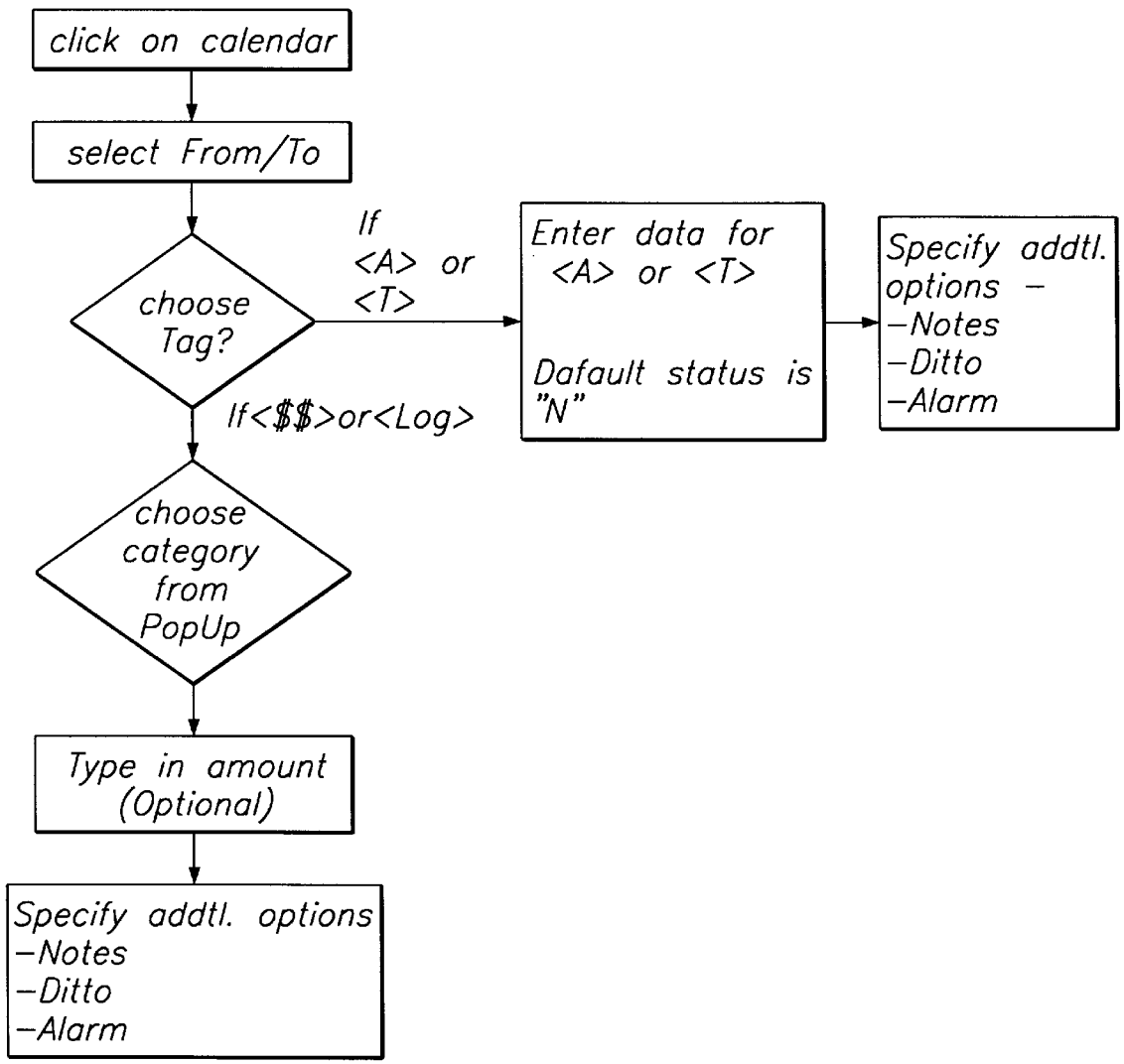
FIG. 20 is a flow chart illustrating operation of a data entry process of the present personal information manager.

Referring to FIG. 20, the process of entering calendar information into the personal information manager is illustrated in greater detail. When the device is first powered up, calendar information for the current day is automatically displayed. If during use the user enters the phone/address facility or the lists facility and wishes to return to the calendar to enter calendar information, the user selects, or clicks on, the calendar icon 321 in FIG. 3. The next step is to select From/To time, using the context-sensitive pop-up screen display of FIG. 4. Then a tag is chosen, using the context-sensitive pop-up screen display of FIG. 5.

Depending on the type of tag chosen, operation will differ. If the tag chosen was <A> or <T>, then data for the entry is entered using the keyboard. The status of the entry is set by default to "N," meaning that the entry has not been completed or checked off. Then additional options may be specified if desired, including notes, repeat entries using the Ditto feature, and an alarm time and mode.

If the tag chosen was <$> or <L>, then data for the entry is entered using pop-up display screens (FIG. 6 and FIG. 7). These screens allows the user to optionally enter an amount. Then additional options may be specified if desired, including notes, repeat entries using the Ditto feature, and an alarm time and mode.

Figure 21:
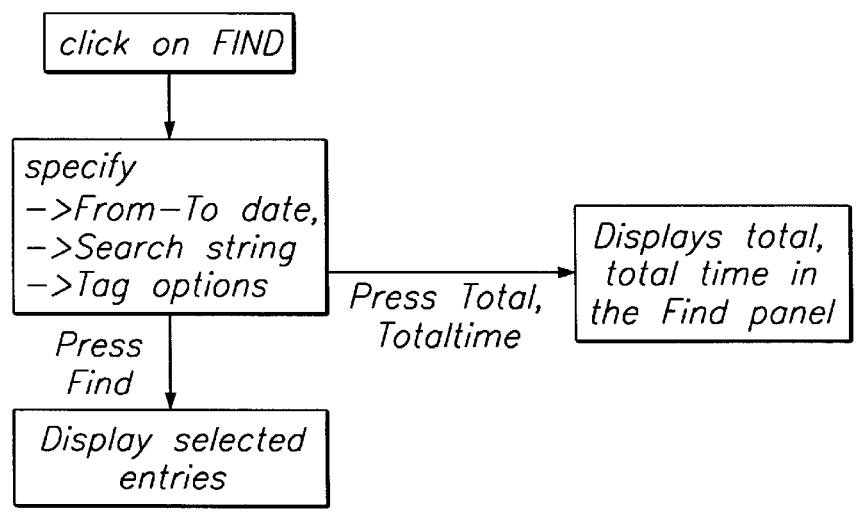
FIG. 21 is a flow chart illustrating operation of a data display process of the present personal information manager.

Referring to FIG. 21, the process of searching for data in the personal information manager is illustrated in greater detail. First, the user clicks on the Find button 305 in FIG. 3. In response, the Find screen of FIG. 12 is displayed. The user then specifies search criteria, including one or more of the following: From-To date, search string, and tag options. If Total or Total Time is selected, then the personal information manager displays an amount total or a time total in the Find screen panel. If Find is selected, the entries matching the search criteria are retrieved and displayed.

As illustrated in FIG. 20 and FIG. 21, both data entry and data retrieval are both greatly simplified using the tag paradigm of the present invention. Although conceptually simple and hence easy to master, the tag paradigm allows most if not all operations to be performed from the main screen and possibly one additional pop-up screen, as opposed to cumbersome navigation through multiple menu layers as in the prior art.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A user interface method for an electronic daily planner/organizer in which a user classifies an information item into a category selected from a group of categories of information consisting of appointments, expense items, log items, to-do items and items of a user-definable type, and in which information items of different categories are entered line-upon-line, regardless of category, within a single unified view corresponding to a single day, the single unified view presenting a series of lines each having multiple data fields including a time data field, a tag data field and a text data field, wherein data entered within the text data field is not required to be of a predefined category, the method comprising the steps of:

a user classifying a first piece of information into one of the group of categories of information; within a line, entering for the first piece of information one of a plurality of tags corresponding to said one of the plurality of categories of information; and entering the first piece of information within the line;

storing the tag for the first piece of information along with the first piece of information;

the user classifying a second piece of information into one of the group of categories of information; within a subsequent line, entering for the second piece of information one of a plurality of tags corresponding to said one of the plurality of categories of information; and entering the second piece of information within the line;

storing the tag for the second piece of information along with the second piece of information;

wherein, when the user classifies the second piece of information into a same one of the plurality of categories of information as the first piece of information, the user enters a tag for the second piece of information that is the same as the tag for the first piece of information, an identical tag entry being used each time a piece of information of a particular category is entered;

wherein, when the user classifies the second piece of information into a different one of the plurality of categories of information than the first piece of information, the user enters a tag for the second piece of information that is different than the tag for the first piece of information; and in response to a user query specifying one or more tags, retrieving like pieces of information based at least in part on said tags.

2. The method of claim 1, wherein each line further includes a time field, said method comprising the further step of:

prior to inputting at least one of said first tag entry and said second tag entry, said user inputting a time entry relating to a corresponding one of said first text entry and said second text entry.

3. The method of claim 2, comprising the further step of:

displaying said lines in ascending time order according to time entries, if any, within respective time fields of said groups of information fields.

4. The method of claim 2, comprising the further steps of:

said user entering a search command;

said user specifying at least one of a range of times, a desired tag, and a desired text string; and retrieving and displaying a plurality of said groups of information fields in which a time in each time field is within said range of times, if specified, and a tag in each tag field is the same as said desired tag, if specified, and text in each text field is the same as same text string, if specified.

5. The method of claim 4, wherein each line further includes a status field, said method comprising the further steps of:

said user inputting in a status field a status entry relating to a corresponding text entry; and within said status field, displaying a symbol indicating to said user that said corresponding text entry does not require further action.

6. The method of claim 4, comprising the further steps of:

said user selecting an information field within including a time field having a time entry;

said user entering a reminder command;

said user specifying a time preceding said time entry; and producing one of a visible indication and an audible indication at said time.

7. The method of claim 4, comprising the further steps of:

said user entering a calculator command;

displaying a calculator display on said display screen; and performing calculations and displaying calculation results in response to inputs from said user.

8. The method of claim 4, comprising the further steps of:

said user selecting an information field within a line;

said user entering a notation command;

said user entering further text relating to a text entry within a text field of said line;

storing said further text; and when said line is displayed, displaying a visible indication that said further text has been entered.

9. The method of claim 4, comprising the further steps of:

said user selecting an information field within a line to be repeated, said line including a time field having a time entry;

said user entering a repeat command;

said user specifying a later time by specifying a time interval at least one day in length; and at said later time, displaying a line having as a time entry said later time and having tag and text entries identical to tag and text entries of said line to be repeated.

10. The method of claim 4, wherein said input device is a touch screen, said method comprising the further step of:

displaying in a sub-area of aid first screen display an array of times for a single day, prompting said user to select a block of time within said day;

wherein the step of said user inputting a time entry comprises touching said touch screen at a first point corresponding to a beginning time and dragging to a second point corresponding to an ending time.

11. The method of claim 10, comprising the further step of:

immediately following said user inputting a time entry, displaying in said sub-area of said first screen display a collection of buttons, each button corresponding to a different tag entry;

wherein the step of inputting a tag entry comprises touching said touch screen within one of said buttons.

12. The method of claim 11, comprising the further step of:

immediately following said user inputting a particular tag entry, displaying in said sub-area of said first screen display a list including a plurality of text entries for said particular tag entry;

wherein, if a desired text entry is listed in said list, the step of inputting a text entry comprises touching said touch screen within said list.

13. The method of claim 12, comprising the further steps of:

displaying in said list of text entries for said particular tag entry a field corresponding to a new text entry; and displaying a keyboard with different touch areas corresponding to various alphanumeric characters;

wherein, if a desired text entry is not listed in said list, the step of inputting a text entry comprises touching a sequence of said touch areas corresponding to various alphanumeric characters.

14. The method of claim 12, comprising the further steps of:

displaying as part of said first screen display a calendar month including text identifying a month and a year of said calendar month;

said user selecting a day within said calendar month;

displaying lines; and said user, within said line, inputting a tag entry specifying a particular type of information, and inputting a text entry describing an information item of said particular type.

15. The method of claim 14, comprising the further steps of:

said user selecting a day within said calendar month; and retrieving and displaying lines entered at a previous time when said day within said calendar month was selected.

16. The method of claim 14, comprising the further steps of:

said user selecting part of said text identifying a month and a year of said calendar month;

displaying a list of months and years;

said user selecting at least one of a month and a year from said list of months and years; and displaying as said calendar month a selected month within a selected year.

17. The method of claim 14, comprising the further steps of:

said user selecting from a display of said calendar month a plurality of days within a week;

retrieving said beginning time and said ending time, if any, from lines entered at a previous time when a day within said week was selected; and displaying said week, indicating said beginning time and said ending time, if any, from said lines.

18. The method of claim 4, comprising the further steps of:

displaying as part of said first screen display first graphic information representative of a telephone list facility;

said user selecting said telephone list facility by touching or pointing to said first graphic information; and displaying a second screen display having a second group of information fields including a name field and at least one of the following information fields: address, zip code, telephone number, fax number, electronic mail address, employer, and notes.

19. The method of claim 18, wherein said second screen display includes a keyboard with different touch areas corresponding to various alphanumeric characters and includes a Find button, said method comprising the further steps of:

said user inputting specified information in at least one of said information fields by touching a sequence of said touch areas corresponding to various alphanumeric characters;

said user selecting said Find button; and retrieving and displaying a group of information fields in which said specified information appears.

20. The method of claim 19, comprising the further steps of:

displaying as part of said second screen display second graphic information representative of a calendar/datebook facility;

said user selecting said calendar/datebook facility by touching or pointing to said second graphic information; and displaying said first screen display.

21. The method of claim 20, comprising the further steps of:

said user selecting within said first screen display a name within a text field to said lines;

said user selecting said first graphic information representative of said telephone list facility;

retrieving a second line having said name in a name field thereof.

22. The method of claim 19, comprising the further steps of:

said user selecting within said second screen display a name within said name field;

said user selecting said second graphic information representing said calendar/datebook facility;

displaying said first screen display;

said user entering a search command;

displaying said name within a name field associated with said search command; and retrieving and displaying a plurality of said lines in which text in each text field includes said name.

23. The method of claim 18, comprising the further steps of:

displaying as part of said first screen display third graphic information representative of a general list facility;

said user selecting said general list facility by touching or pointing to said third graphic information; and displaying a third screen display having a list of lists.

24. The method of claim 23, comprising the further steps of:

said user selecting a list from said list of lists; and displaying a fourth screen display having a list of items.

25. A method of entering personal information items into a personal information manager, comprising the steps of:

entering and displaying within a single unified view personal information items belonging to a plurality of different categories of personal information items such that personal information items belonging to different categories are intermingled within said single unified view; and entering and displaying tags for a plurality of said personal information items, enabling retrieval of said personal information items by category, each tag corresponding to a single personal information item and being displayed so as to be visually associated with the single personal information item;

wherein personal information items belonging to the same category are tagged with the same tag, said categories including a plurality of the following: APPOINTMENTS, EXPENSE ITEMS, LOG ITEMS, TO-DO ITEMS AND ITEMS OF A USER-DEFINABLE TYPE.

26. The method of claim 25, wherein said single unified view corresponds to a predetermined period of time.

27. The method of claim 26, wherein said predetermined period of time is a single day.

28. The method of claim 25, wherein said personal information items are entered into fields not predefined to receive data of a certain category.

29. A method of entering personal information items into a personal information manager, comprising the steps of:

entering and displaying within a single unified view personal information items belonging to a plurality of different categories of personal information items such that personal information items belonging to different categories are intermingled within said single unified view; and entering and displaying tags for a plurality of said personal information items, enabling retrieval of said personal information items by category, each tag corresponding to a single personal information item and being displayed so as to be visually associated with the single personal information item;

wherein personal information items belonging to the same category are tagged with the same tag, said categories including LOG ITEMS and a least one of the following: APPOINTMENTS, EXPENSE ITEMS, TO-DO ITEMS AND ITEMS OF A USER-DEFINABLE TYPE.

30. The method of claim 29, wherein said personal information items are entered into fields not predefined to receive data of a certain category.

31. A method of entering personal information items into a personal information manager, comprising the steps of:

entering and displaying within a single unified view personal information items belonging to a plurality of different categories of personal information items such that personal information items belonging to different categories are intermingled within said single unified view; and entering and displaying tags for a plurality of said personal information items, enabling retrieval of said personal information items by category, each tag corresponding to a single personal information item and being displayed so as to be visually associated with the single personal information item;

wherein personal information items belonging to the same category are tagged with the same tag, said categories including ITEMS OF A USER-DEFINABLE TYPE and at least one of the following: APPOINTMENTS, EXPENSE ITEMS LOG ITEMS AND TO-DO ITEMS.

32. The method of claim 31, wherein said personal information items are entered into fields not predefined to receive data of a certain category.

* * * * *